UNITED STATES PATENT OFFICE.

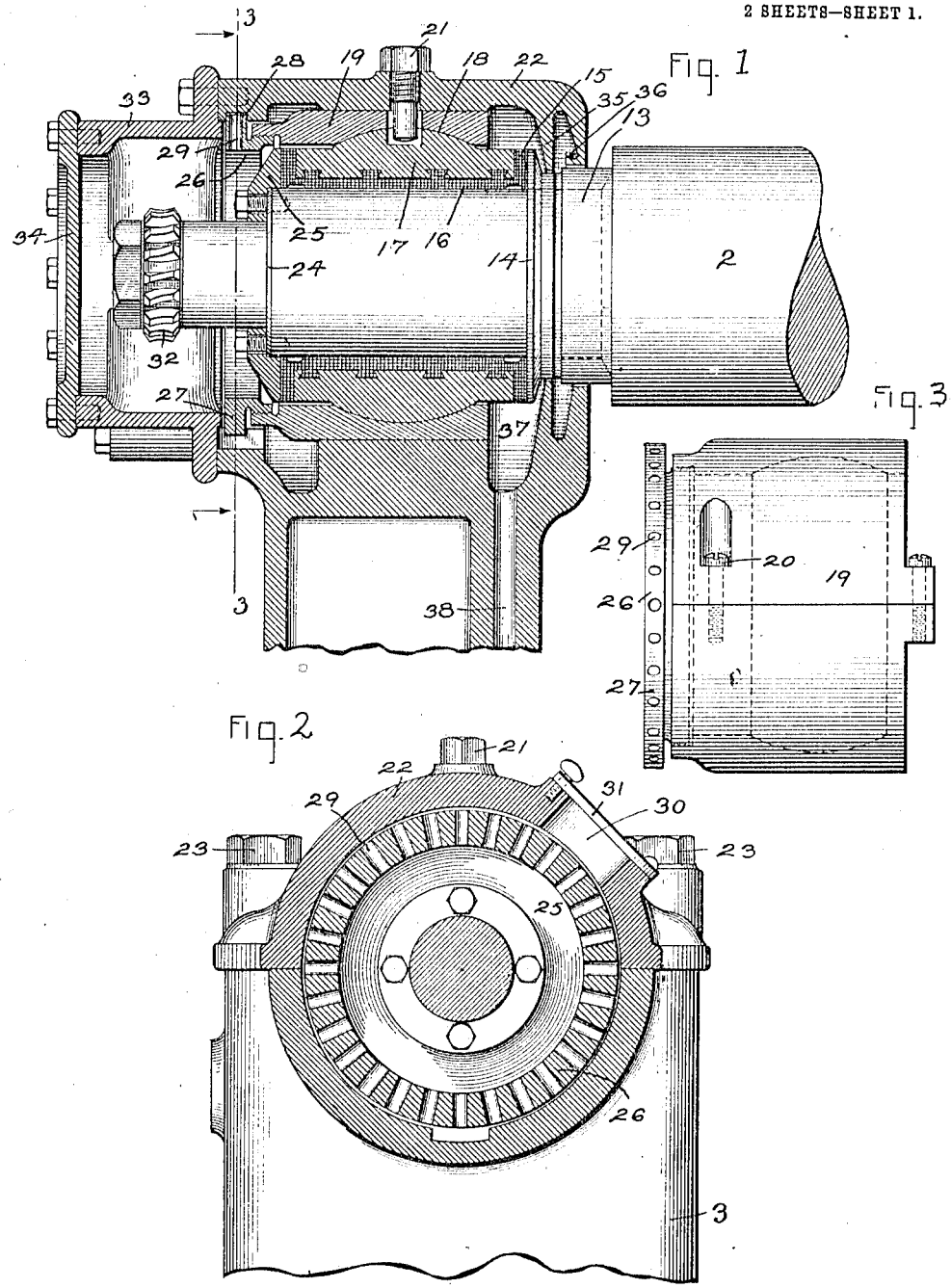

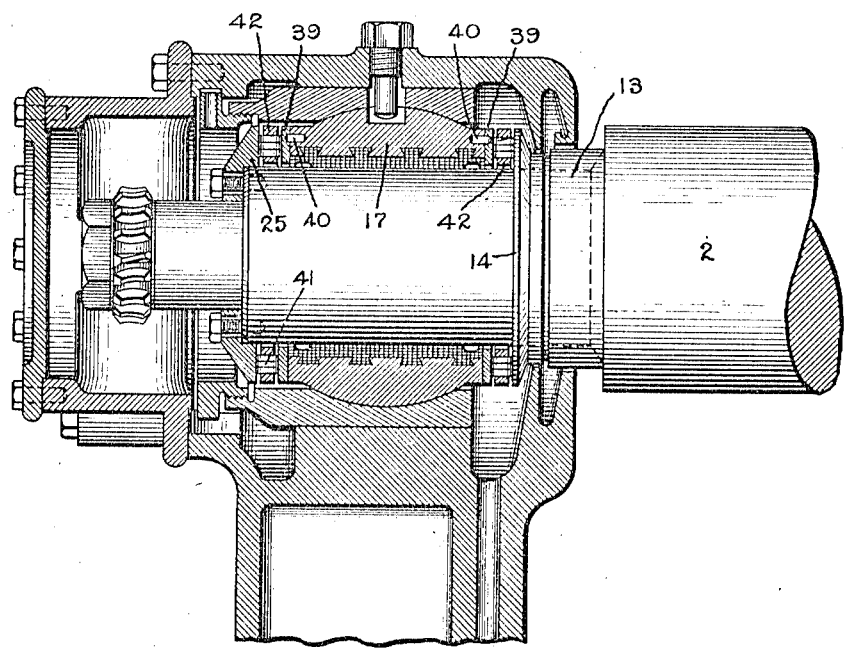

OSCAR JUNGGREN, OF SCHENECTADY, NEW YORK, ASSIGNOR TO GENERAL ELECTRIC COMPANY, A CORPORATION OF NEW YORK.

THRUST-BEARING.

963,296.  Specification of Letters Patent.  Patented July 5, 1910.

Application filed September 16, 1907. Serial No. 393,158.

*To all whom it may concern:*

Be it known that I, OSCAR JUNGGREN, a citizen of the United States, residing at Schenectady, county of Schenectady, State of New York, have invented certain new and useful Improvements in Thrust-Bearings, of which the following is a specification.

The present invention relates to thrust bearings, and more particularly to those used on elastic-fluid turbines to center the rotating member with respect to the stationary member and to prevent the same from moving in either direction under changes in operating conditions.

The object of the invention is to provide a thrust bearing of improved construction whereby the rotary member can be quickly and accurately adjusted to a given position and retained there when adjusted.

In the accompanying drawings, which illustrate one of the embodiments of my invention, Figure 1 is an enlarged axial section of the bearing and pillow-block; Fig. 2 is a cross-section on line 3 3 of Fig. 1; Fig. 3 is a detail view of the sleeve which surrounds the bearing; and Fig. 4 is a view similar to Fig. 1 showing a roller bearing for taking the end thrust.

Referring to Fig. 1, 2 indicates the main shaft of a turbine or other machine, which is to be held against longitudinal movement, but is to be permitted to rotate freely. The portion of the shaft entering the bearing is reduced in cross-section, and mounted thereon is a collar 13 which is slipped endwise on the shaft. This collar is provided with an annular flange 14 which engages with the vertically disposed portions 15 of the lining 16. The lining is supported in upper and lower bearing blocks 17 having a spherical enlargement 18, the corresponding seat for which is formed in the axially adjustable sleeve 19 shown in side elevation in Fig. 3. The spherical enlargement permits the bearing to be self alining. The sleeve 19 is split into two parts, and the parts are united by the screws 20. The bearing blocks and sleeve are prevented from turning by the bolt 21 whose head projects through the cover 22 of the pillow-block. The cover is fastened to the pillow-block in the usual way by bolts 23. The shaft is provided with a shoulder 24 adjacent its outer end to which there is secured by suitable bolts a collar 25. This collar engages one of the annular portions 15 of the lining. It will thus be seen that the shaft is prevented from moving endwise by the collars 13 and 25, which engage opposite ends of the bearing blocks.

Since it is necessary to adjust the position of the parts from time to time, the left-hand end of the sleeve 19 is interiorly threaded to receive the threads on the nut 26. This nut is made in the form of a ring and is provided with a peripheral annular projection 27 which enters a correspondingly shaped groove 28, one half of the groove being formed in the standard or pillow-block proper and the other half in its cap or cover 22. In the projection 27 are drilled a number of holes 29 to receive a bar or other device for adjusting the nut when it is desired to move the sleeve 19 in one direction or the other to adjust the bearing. In order that this may be done without disturbing the alinement of the parts or taking the machine down in any way, an opening 30 is provided in the cap 22 through which the turning bar can be inserted. This opening is normally closed by the cover 31. Mounted on the end of the shaft is a worm 32 which meshes with a worm-wheel on the governor shaft of the turbine (not shown) whereby the latter is driven at a reduced speed. The worm and also the end of the bearing is inclosed in a casing 33, which is bolted to the pillow-block and its cover and assists in holding the latter in place. The casing 33 is provided with a detachable cover 34.

In order to prevent lubricant from leaking out of the pillow block at the right-hand end, an internal flange 35 is provided which coöperates with the adjacent flange 14 on the shaft collar to form an oil-thrower. As an additional precaution the cover 22 is provided with an inturned flange containing a gutter 36 so that any oil thrown out by the revolving collar 13 is caught in the surrounding recess and conveyed by the gutter to the bottom of the recess where it drains into the chamber 37, the latter communicating with a conduit 38. Preferably the lubricant for the bearing is supplied under pressure from a pump driven by the turbine or other suitable source.

It is evident that when the parts are assembled the bearing 17 is prevented from moving endwise by reason of the spherical enlargement which is seated in the sleeve 19 and that the sleeve is prevented from moving endwise by the nut 26 which is seated in a groove in the cover and the main body of the pillow-block.

When it is desired to adjust the shaft 2 in either direction for the purpose of changing the clearance of the relatively moving turbine buckets and nozzles or other machine parts, the cover 31 is removed or swung around, an operating bar is inserted in one of the holes 29, and the nut 26 is moved forward or back as occasion demands until the proper adjustment is obtained, after which the cover 31 is replaced. It will be noted that all of the wearing between the rotating and stationary parts takes place on the babbitt lining 15 which is easily replaced, and that all tendency for the sleeve 19 to rotate is prevented by the bolt 21, and hence there is no strain on the nut 26 tending to move it in an angular direction, and thus destroy the adjustment. Whatever thrust there is on the bearing is taken care of by the numerous threads between the nut and the sleeve and the large, flat surfaces between the projection on the nut and the walls of the groove in the pillow-block and cap.

It sometimes happens that for one reason or another the machine has a very heavy thrust in one or both directions. In such cases I may substitute for the portions 15 the roller bearings shown in Fig. 4. In this figure, 13 and 25 indicate collars on the shaft, the collar 13 having an annular flange 14. 17 designates one of the bearing blocks, and 39 hardened steel wearing plates at its ends which are prevented from rotating by the pins 40. The faces of the flange 14 and collar 25 are also preferably hardened or provided with a removable plate, and between the two sets of hardened faces are rollers 41 carried by the ring-shaped retainers 42. It is evident that the operation of this modification, in so far as the adjustment is concerned, is the same as that previously described, and that, owing to the fact that rollers are substituted for the babbitt, the wear can be reduced to a minimum. Since the rollers are located at the ends of the bearings and surrounding the shaft, lubricant as it escapes through the clearance between the shaft and the lining will be discharged outwardly through the space containing the rollers and thus amply lubricate them. I prefer to employ independent removable collars so that if they are injured they can be readily replaced, which would not be the case if they were an integral part of the shaft.

Owing to the fact that the bearing blocks have a spherical enlargement the bearing as a whole is self-alining and since the surrounding sleeve 19 forms the seat its axial adjustment in no way interferes with the capacity for self-adjustment, which is a valuable feature. As the diameter of the adjusting nut is large, the pressure on the threads and the faces of its projection is comparatively small. The large diameter of the nut is further useful in adjusting the parts longitudinally.

In accordance with the provision of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is,

1. In combination, a shaft, a bearing for supporting it, a sleeve in which the bearing is seated, thrust-collars on the shaft, and a means for moving the sleeve longitudinally and with it the bearing and shaft.

2. In combination, a shaft, a bearing therefor having an enlargement, a sleeve having a seat for the enlargement, thrust-collars on the shaft located at opposite ends of the bearing, and a screw-threaded nut for adjusting the sleeve and through it the bearing and shaft.

3. In combination, a shaft, a bearing therefor having an external enlargement, means transmitting the thrust of the shaft to the bearing, a sleeve surrounding the bearing and having a seat corresponding in shape to the enlargement, a pillow-block in which the sleeve is mounted for axial movement, a nut threaded to the sleeve and held by the pillow-block against axial movement, and a means for rotating the nut to adjust the longitudinal position of the shaft.

4. In combination, a shaft, a bearing therefor having a spherical external enlargement, means transmitting the thrust of the shaft to the ends of the bearing, a sleeve surrounding the bearing and provided with a cylindrical outer surface and a seat on the inside for the enlargement on the bearing, and a ring-nut which is threaded to the sleeve and is prevented from moving endwise by the pillow-block, the said pillow-block having an opening through which a tool can be inserted for rotating the nut in either direction.

5. In combination, a shaft, a split bearing therefor, having an external enlargement, means secured to the shaft at opposite ends of the bearing for transmitting thrust thereto, a split sleeve which surrounds the bearing and forms a seat therefor, a pillow block in which the sleeve is longitudinally guided, and a nut which is threaded to the sleeve and is provided with an annular external projection that is seated in the pillow block, the latter being provided with an opening through which the nut can be rotated to adjust the bearing.

6. In combination, a shaft, a split bearing therefor having an external spherical enlargement, a sleeve supporting the bearing, collars on the shaft at opposite ends of the bearing for transmitting thrust thereto, rollers between the collars and bearing, a pillow-block in which the sleeve is slidably mounted, a screw-threaded means for adjusting the sleeve, bearing and shaft, and means for preventing the free escape of lubricant from the pillow-block.

7. In combination, a shaft, a bearing for said shaft, a sleeve in which the bearing is seated, thrust collars on the shaft at opposite ends of the bearing, rollers between the collars and the ends of the bearing, a pillow-block in which the sleeve is slidably mounted, and means for adjusting the sleeve in the pillow-block and thereby adjusting the bearing and the shaft.

In witness whereof I have hereunto set my hand this 13th day of September, 1907.

OSCAR JUNGGREN.

Witnesses:
BENJAMIN B. HULL,
MARGARET E. WOOLLEY.